June 24, 1941.  S. SMITH  2,246,700

SELF-CORRECTIVE DETACHABLE SHEET FOR SCHOOL TEXTBOOKS

Filed June 8, 1940  2 Sheets-Sheet 1

INVENTOR
Samuel Smith
BY
ATTORNEY

June 24, 1941.  S. SMITH  2,246,700
SELF-CORRECTIVE DETACHABLE SHEET FOR SCHOOL TEXTBOOKS
Filed June 8, 1940  2 Sheets-Sheet 2
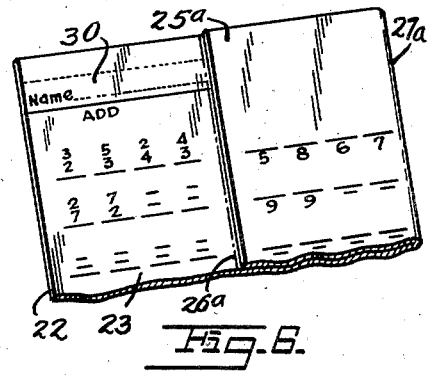
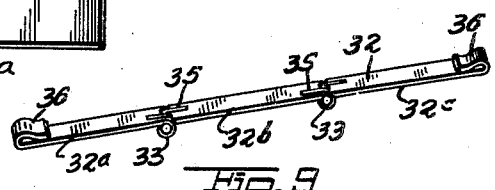
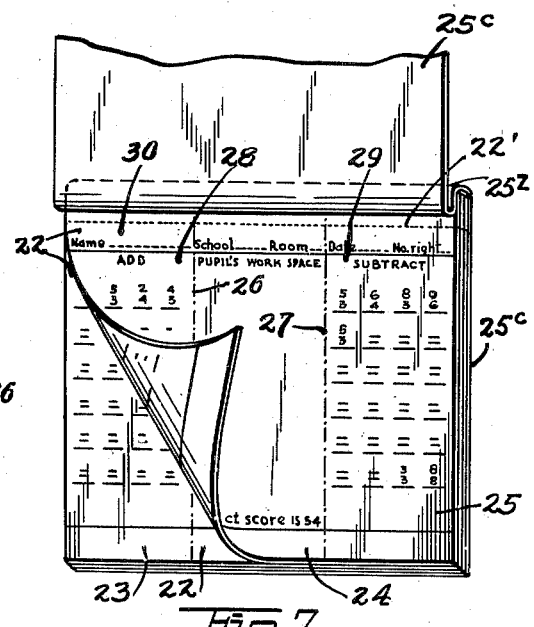
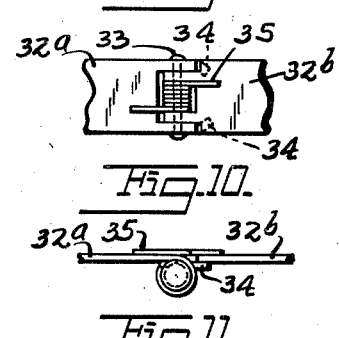
INVENTOR
Samuel Smith
BY
ATTORNEY Patented June 24, 1941

2,246,700

UNITED STATES PATENT OFFICE 2,246,700

SELF-CORRECTIVE DETACHABLE SHEET FOR SCHOOL TEXTBOOKS

Samuel Smith, Brooklyn, N. Y.

Application June 8, 1940, Serial No. 339,541

8 Claims. (Cl. 35—48)

This invention relates to new and useful improvements in self-corrective question-answer books with folding and detachable sheets for school text books.

More specifically, the invention proposes the construction of a book, pad or other collection of bound sheets, or loose sheets, in which the sheets are imprinted and constructed in a certain manner to permit easy correction, checking of answers and scoring of results to facilitate the studies of students.

More specifically, the invention proposes to characterize each sheet referred to in the previous paragraph, in accordance with this invention, so that it has several areas with problems printed on the front faces of the areas, and answers to the problems printed on the back faces and arranged so that said sheet may be folded several ways with a front face of one area having problems then being adjacent the back face of another area which gives the answers to these problems. It is proposed that when said sheets are bound in book form, that said areas are so arranged that the binding interferes with the required folding of said sheets to place said related areas adjacent each other. It is proposed that each sheet have scoring or perforations adjacent the binding to facilitate detachment. Then the sheet may be properly folded, as specified.

More specifically, the invention is intended for use in conjunction with school textbooks in all subjects, college textbooks in all subjects, school and college tests in all subjects, correspondence school and home study materials, all subjects, quiz books, question-answer books and games or toys, question-answer pages or sections of magazines and periodicals and newspapers, civil service examinations and other tests given by public authorities.

Still further the invention contemplates so arranging said sheets that one or more of the areas may be used as a work space for a pupil to place answers to the various problems thereon.

Still further the invention contemplates a modified form in which mechanical means is provided to tend to prevent pupils from prematurely folding the sheet and copying an answer.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 1 is a perspective view of a sheet constructed in accordance with this invention.

Fig. 2 is a rear perspective view of the sheet shown in Fig. 1.

Fig. 3 is a fragmentary perspective view of the sheet shown in Fig. 1 with an area thereof folded in accordance with this invention.

Fig. 4 is a perspective view of a sheet constructed in accordance with a modified form of this invention.

Fig. 5 is a perspective view of the rear side of the sheet shown in Fig. 4.

Fig. 6 is a fragmentary perspective view of Fig. 4 showing the sheet in a folded condition.

Fig. 7 is a perspective view of a book with self-corrective detachable sheets, constructed in accordance with this invention.

Fig. 8 is a fragmentary elevational view of the sheet shown in Fig. 1 associated with resilient holding strips, as mechanical variations, in accordance with a modified form of this invention.

Fig. 9 is a perspective view of one of the resilient holding strips shown in Fig. 8.

Fig. 10 is a fragmentary enlarged detailed view of a portion of Fig. 9.

Fig. 11 is a side elevational view of Fig. 10.

The self-corrective detachable sheet for school text books, and the like, in accordance with the form of the invention illustrated in Figs. 1 to 3, includes a sheet 12 showing the remains of a score line or perforations 12' along its top edge which facilitated removal of the sheet from a bound book, said sheet 12 having several areas 13, 14 and 15 separated by the dot and dash lines 16 and 17 respectively. Problems 18 and 19 are printed on the front faces of certain of the areas. The problems 19 are problems in subtraction. The top of the sheet is imprinted with material 20 for receiving the name of the pupil, school, room, date, etc. The area 14 is a blank area comprising a work space in which a pupil may calculate the answers to the various problems. The first problem of each group of problems contains its correct answer so as to suggest to the pupil the manner in which the sheet should be used.

The back of the sheet 12 contains areas 13a, 14a and 15a comprising the back faces of the areas 13, 14 and 15, respectively. These areas are divided by lines 16a and 17a which are directly aligned with the lines 16 and 17. In fact, the lines 16, 17 and 16a, 17a may comprise score lines imprinted through the material of the sheet 12.

Answers 18ᵃ and 19ᵃ for the problems 18 and 19 are printed on the back areas of the sheet 12. These answers are so arranged that when areas of the sheet are folded upwards, as for example shown in Fig. 3, the answers for the exposed problems may be directly viewed. The area 14ᵃ is imprinted with study material and other material, as desired.

The sheet is used in the following manner:

Each pupil is given a book containing the self-corrective detachable sheets. The pupil uses the top sheet. After he has completed the work on the sheet he waits until he is instructed to tear the page off along the score line or perforations. It is pointed out that inasmuch as the book is bound along an area adjacent the score line or perforations the binding prevents the pupil from turning the sheet over so as to copy the answers on the back thereof. If he turns up a portion of the sheet the answers will appear upside down, and moreover, it will be quite difficult to match the answers with the questions on the sheet without tearing out the sheet and properly folding it. Furthermore, suitable steps may be taken to make it more difficult to read and align the answers in an upside down position. For example, superfluous and incorrect answers may be included on the reverse side of the sheet so that unless the sheet is properly folded and aligned it is very difficult to copy the right answers.

While the drawings show the invention applied to arithmetic it should be clearly understood that the books may apply to other subjects, for example, English, though again this is only for illustrative purposes.

It may be advisable to point out additional procedure for using the sheets when such sheets are bound in regular book form. Such books may be used in the classroom. The pupils complete the work consisting not only of problems but also and/or questions, given in one column of the page or those given on the entire page. The pupils must then await further instructions from the teacher, if this is a classroom situation.

The teacher may collect the books before the pages are detached or the work is corrected, and examine the pupils' answers. Or, within her discretion, the teacher may then and there instruct pupils to detach part or all of the page and correct their work, the page being torn always along the perforations.

In Figs. 4–6 inclusive, another form of the invention has been disclosed which distinguishes from the prior form in the fact that the study sheet has been laid out along the length of the sheet, as contrasted with the height of the sheet in the prior form. In this form of the invention there is a sheet 22 with remains of perforations 22' along its top edge, and said sheet being divided into several areas 23, 24 and 25 by score lines, or dot and dash lines 26 and 27. The area 23 is imprinted with problems 28. The area 25 is imprinted with problems 29. The central area 24 comprises a work space for the problems. The sheet has material 30 along its top edge for the pupil's name, school, room, etc.

The back of the sheet 22 is provided with complementary areas 23ᵃ, 24ᵃ and 25ᵃ. The areas 25ᵃ and 23ᵃ contain the answers to the problems on the areas 23 and 25, respectively. The areas 23ᵃ, 24ᵃ and 25ᵃ are separated from each other by score or dot and dash lines 26ᵃ and 27ᵃ which are superimposed on the lines 26 and 27. The sheet 22 may be folded along these lines 26 and 27 so that the answers to the problems are disposed adjacent the problems, as indicated in Fig. 6.

In Fig. 7 a perspective view of a bound book provided with sheets in accordance with this invention has been disclosed. The binding is represented by reference numeral 25ᶻ. It should be noted that the score line or perforations 22' run parallel to the binding 25ᶻ. The lower left hand corner of the top sheet is shown turned upwards to illustrate that the answers on the back are upside down. The book may or may not be provided with covers. It is illustrated with covers 25ᶜ.

In Figs. 8–11 inclusive another form of the invention has been disclosed characterized by the fact that the book of sheets or sheet, in accordance with this invention is associated with a holding mechanical means resisting the bending over of areas of the sheets or sheet to expose the answers to the problems. Specifically, the sheet 12 (or a book of sheets) is provided with clips 32 mounted along the top and bottom edge portions. These clips are arranged to hold the sheet or sheets flat. The sheets 12 are provided with the various portions as previously explained. These parts may be identified by the reference numerals previously applied.

Each clip 32 is formed from several sections 32ᵃ, 32ᵇ and 32ᶜ. These sections are hingedly connected by hinge constructions 33. These hinge constructions are arranged to be aligned with the score lines 16 and 17. Each hinge 33 is provided with stop elements 34 which limit opening of the hinge into a position in which all of the sections are in a straight line. However, each hinge 33 may be pivoted by moving the outer sections upwardly.

Springs 35 are coaxially mounted on the hinges 33 and have their ends acting between adjacent sections of the clip to hold the clip in a specific position. The outer sections 32ᵃ and 32ᶜ are provided with resilient hook portions 36 adapted to receive and hold the edge portions of the sheet 12, as shown in Fig. 8.

The operation of this form of the device is as follows:

The self-corrective book of sheets or sheet is used in a manner identical to that previously disclosed. However, the tendency for a child to turn up the sides of the sheet or sheets 22 and glance at the answers is reduced since an obstacle has been placed in the way. To bend up an area of the sheet 12 it is now necessary that the top clip be grasped in one hand and the bottom clip in the other hand and then the clips simultaneously bent at one of their ends, or removed, so that a side of the sheet 12 may be bent up and over. This operation is sufficient obstacle to reduce the temptation of cheating. The clips 32 may be slipped off the sheet or sheets 12 after the pupil has finished solving the problems. Then the sheet may be used as previously explained.

It is to be understood that the self-corrective book may be of any shape and size, and could be used as regular text-book, with perforations on the side, and the fold lines may be located at any suitable position and direction for obtaining the answers to the problems.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A self-corrective detachable sheet school text book or the like, comprising a bound book of sheets, each sheet having several appropriately designated areas, problems, printed on the front faces of said areas, and answers to said problems printed on the back faces of said areas and arranged so that said sheet may be folded several ways with the front face of one area having problems being adjacent the back face of another area having answers to said problems, and each sheet having a score line or perforations extended along the binding, said areas comprising three areas separated by two straight lines.

2. A self-corrective detachable sheet school text book or the like, comprising a bound book of sheets, each sheet having several appropriately designated areas, problems printed on the front faces of said areas, and answers to said problems printed on the back faces of said areas and arranged so that said sheet may be folded several ways with the front face of one area having problems being adjacent the back face of another area having answers to said problems, and each sheet having a score line or perforations extended along the binding, said areas comprising three areas separated by two straight lines, which are score lines or other lines facilitating the folding of the sheet.

3. In an article of the class described, a sheet of flexible material, parallel spaced score lines extended longitudinally of said sheet dividing off appropriately designed areas, said score lines facilitating the folding over of said areas to expose material imprinted on the back thereof, a strip positioned across the back of said sheet at right angles to said score lines, and clips formed on the end of said strip and engageable upon the edges of said sheet for holding said sheet against being folded.

4. In an article of the class described, a sheet of flexible material, parallel spaced score lines extended longitudinally of said sheet dividing off appropriately designed areas, said score lines facilitating the folding over of said areas to expose material imprinted on the back thereof, a strip positioned across the back of said sheet at right angles to said score lines, and clips formed on the end of said strip and engageable upon the edges of said sheet, said strip being formed with hinges in aligned position with said score lines, whereby portions of said strip and adjacent areas may be folded when desired to expose said printed material.

5. In an article of the class described, a sheet of flexible material, parallel spaced score lines extended longitudinally of said sheet dividing off appropriately designed areas, said score lines facilitating the folding over of said areas to expose material imprinted on the back thereof, a strip positioned across the back of said sheet at right angles to said score lines, and clips formed on the end of said strip and engageable upon the edges of said sheet, said strip being formed with hinges in aligned position with said score lines, whereby portions of said strip and adjacent areas may be folded when desired to expose said printed material, and means on said hinges for urging the portions of said strip into positions in which said areas will be extended.

6. In an article of the class described, a sheet of flexible material, parallel spaced score lines extended longitudinally of said sheet dividing off appropriately designed areas, said score lines facilitating the folding over of said areas to expose material imprinted on the back thereof, a strip positioned across the back of said sheet at right angles to said score lines, and clips formed on the end of said strip and engageable upon the edges of said sheet, said strip being formed with hinges in aligned position with said score lines, whereby portions of said strip and adjacent areas may be folded when desired to expose said printed material, and means on said hinges for urging the portion of said strip into positions in which said areas will be extended, comprising a spring for each of said hinges mounted concentric with the pivot thereof, and having ends engaging the material of said strip on either side of the hinge.

7. In an article of the class described, a sheet of flexible material, parallel spaced score lines extended longitudinally of said sheet dividing off appropriately designed areas, said score lines facilitating the folding over of said areas to expose material imprinted on the back thereof, a strip positioned across the back of said sheet at right angles to said score lines, and clips formed on the end of said strip and engageable upon the edges of said sheet, said strip being formed with hinges in aligned position with said score lines, whereby portions of said strip and adjacent areas may be folded when desired to expose said printed material, and means on said hinges for urging the portion of said strip into positions in which said areas will be extended, comprising a spring for each of said hinges mounted concentric with the pivot thereof, and having ends engaging the material of said strip on either side of the hinge, and means for limiting the rearward pivoting of the portions of said strip to a position in which said portions will be in axial alignment.

8. A self-corrective detachable sheet school text book or the like, comprising a bound book of sheets, each sheet having several side areas separated by a central area and said areas being separated by fold lines extending substantially at right angles to said binding, problems printed on the front face of said side areas, answers to said problems printed on the back face of said side areas, answers to the set of problems appearing on the face of one of said side areas being on the back face of the other of said side areas, and a weakened line formed on each sheet parallel to the binding and at right angles to said fold lines, whereby any one of said sheets may be removed from said bound book to permit either of said outer areas to be folded over on said central area to expose the answers to the problems appearing on the face of said other side area.

SAMUEL SMITH.